May 28, 1929.        A. F. TAGGART        1,714,645
SEAT SYSTEM
Filed Dec. 10, 1927
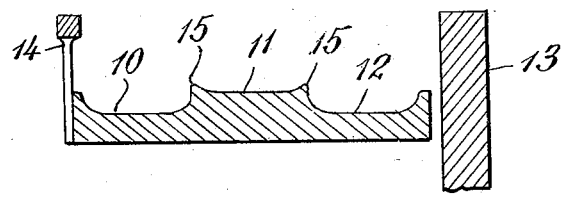
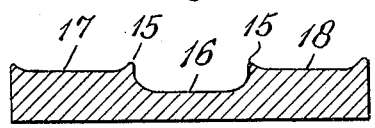
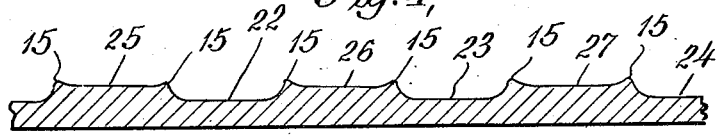
INVENTOR
Arthur F. Taggart
BY
ATTORNEYS Patented May 28, 1929.

1,714,645

UNITED STATES PATENT OFFICE.

ARTHUR F. TAGGART, OF SCARSDALE, NEW YORK.

SEAT SYSTEM.

Application filed December 10, 1927. Serial No. 239,062.

This invention relates to a seat system and has for its object the provision of an improved arrangement of seats adapted for the accommodation of two or more people side-by-side. The invention is more particularly directed to a side-by-side system of seats that will increase the effective seating capacity of a given space, such as in cars and the like.

It has heretofore been proposed to increase side-by-side seating capacity by removing dividing partitions between adjacent seats, and to utilize the space ordinarily occupied by such partitions for seating purposes. The additional space thus gained is, however, rarely fully utilized for the well known reason that seat occupants have a distinct disinclination to want others, particularly strangers, to sit closely next to them. Those seated tend to spread out over the greatest space possible and thus consciously or unconsciously resist the seating of others. In many instances, those already seated are totally oblivious to the wants of those who are not seated. The mere removal of partitions does not, in any event, appear to have solved the problem of seating a maximum number of people.

The problem of seating the greatest number of people in a given space is becoming more and more acute, particularly in our more heavily populated areas. It is particularly pertinent in passenger vehicles, such as railroads, subways and auto-buses, operated in and to and from cities. Numerous attempts have been made to seat more people in a given space. An innovation in railroad passenger service has been recently attempted. Instead of having the usual two two-passenger seats on both sides of an aisle running lengthwise down the center of a car, three-passenger seats are substituted for the two-passenger seats on one side of the aisle while the corresponding two-passenger seats on the other side of the aisle are made smaller but still adapted to seat two passengers each. The aisle is made smaller than usual, and is moved to the side of the center of the car. The old system thus provided for only four seat occupants across the width of the car, while the new system is intended for five such occupants. In practice it has been found that the first occupant in the two-passenger seat, which is, of course, smaller than it used to be, frequently attempts to retain the whole seat. Two occupants in the three-passenger seat generally spread out in such manner as not to invite a third passenger. This condition obtains even though there are a number of passengers standing in the aisle. Thus, we often have but three (instead of the intended five) passengers seated across the width of the car, whereas the old system usually had at least four such occupants. Moreover, since the aisle space is made narrower, those forced to stand are more uncomfortable than ever.

According to the present invention a side-by-side seating arrangement becomes possible that fully utilizes all the available space and discourages an occupant from spreading onto an adjoining seat. Each seat stands out alone and is readily available to a passenger even though the adjacent seat or seats is already occupied.

In accordance with the practice of the present invention a seat system is provided comprising a plurality of side-by-side seats with the bottoms of adjacent seats on different levels.

The difference in level of the bottoms of adjacent seats is preferably not more than three inches. This arrangement makes it decidedly uncomfortable for a seated occupant to spread or encroach beyond the allotted seat space. A further method of discouraging spreading-out is to shape the bottom of the seats so that their adjoining side boundaries terminate in a slightly elevated rim or ridge portion which may be relatively acute or sharp. Such angular ridges between adjacent seats define their lateral boundaries. It is too uncomfortable for a passenger to straddle this ridge portion, and the adjacent seat remains ready for the next occupant.

The side-by-side seating arrangement contemplated by the present invention admits of a number of modifications. Since no two adjoining seat bottoms are on the same level, it is possible to vary the arrangement of seats. Thus, alternate seats may be placed at substantially the same level. Or, a series of seats may be placed at progressively lower, or higher, levels.

These and other features of my invention will be more readily understood by reference to the accompanying drawing, taken in conjunction with the following description, in which:

Fig. 1 is a cross-section in part of a series of three seats illustrative of the invention;

Fig. 2 is a cross-section in part of a modified three-seat arrangement;

Fig. 3 is a cross-section in part of another modified three-seat arrangement; and Fig. 4 is a cross-section in part of a seat arrangement adapted for the seating of a relatively large number of passengers, as along the long side of a car.

A series of three seats are shown in Figs. 1, 2 and 3. In the arrangement more particularly shown in Fig. 1, the side-by-side seats 10, 11 and 12 are located between the wall 13 and the arm rest 14 next to an aisle. The end seats are at substantially the same level, while the middle or center seat is at a level slightly higher than that of the adjacent end seats. The difference in level ranges, preferably, from one to three inches. The bottoms of the seats are so shaped as to form a slightly elevated rim or ridge portion 15, which may be made acute, between adjacent seats.

The modified form of three-passenger side-by-side seating arrangement shown in Fig. 2 is similar in construction to that shown in Fig. 1, except that the middle or center seat 16 is at a level lower than that of the adjacent end seats 17 and 18.

Fig. 3 also illustrates a modified three-passenger seating arrangement. In this instance the seats 19, 20 and 21 are all at different levels, and each successive seat (from the reader's left to right) is at a progressively lower level.

A side-by-side seating arrangement adapted for a relatively large number of people, as along the side of a passenger coach, is shown in Fig. 4. Alternate seats 22, 23, 24 etc., are at substantially the same level. The alternate seats 25, 26, 27, etc. are also at substantially the same level, but at a level different than that of the adjacent seats. The drawing shows the latter at a higher level than the former.

The arrangement of seats just described will not only tend to keep those seated in their own places, but it will also make side-by-side sitting more comfortable for a given amount of space. Passengers seated closely on the same seat level, as is now the general custom, will usually contact against one another at their hips elbows or shoulders. If side-by-side seats at different levels are employed, such as contemplated by the invention, there is less tendency for contact of hips elbows or shoulders. The hips of the passenger on the higher seat will flare over into the waist section of the one on the lower seat, while the shoulders and elbows of the latter will fit under the shoulders and elbows of the former—, assuming that the passengers are of approximately the same height.

In other words, according to the old arrangement of seating passengers on the same level, a maximum amount of horizontal seat space is necessary for a given number of people. But, if that same number of passengers is seated in accordance with the practice of this invention, when the broadest part of each person is in juxtaposition to the narrower parts of the adjacent person, a minimum amount of horizontal seat space becomes possible. Hence, it is seen that the present invention not only assures the seating of as many persons as there are seat allotments, but it also makes it possible to seat more people in a given amount of space than has been the practice heretofore.

I claim:

An unpartitioned seat for public conveyances and the like, comprising a plurality of narrow individual contiguous alternately arranged high and low seating surfaces, whereby the hips of an occupant of a higher seating surface may flare over into the waist section of the occupant of a lower adjacent seating surface.

In testimony whereof I affix my signature.

ARTHUR F. TAGGART.